US008936327B2

(12) United States Patent
Wu

(10) Patent No.: US 8,936,327 B2
(45) Date of Patent: Jan. 20, 2015

(54) BEZEL ASSEMBLY FOR ELECTRONIC DEVICE

(75) Inventor: Zhi-Ping Wu, Wuhan (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 84 days.

(21) Appl. No.: 13/533,387

(22) Filed: Jun. 26, 2012

(65) Prior Publication Data

US 2013/0099635 A1     Apr. 25, 2013

(30) Foreign Application Priority Data

Oct. 19, 2011    (CN) .......................... 2011 1 0318437

(51) Int. Cl.
*A47B 97/00*          (2006.01)
*G06F 1/16*            (2006.01)
*G11B 17/04*          (2006.01)

(52) U.S. Cl.
CPC .................................. *G11B 17/0405* (2013.01)
USPC .................. 312/223.2; 312/265.6; 361/679.02

(58) Field of Classification Search
CPC ............. H05K 5/00; H05K 5/02; H05K 5/03; H05K 7/00; H05K 7/18; G06F 1/16; G06F 1/181; G06F 1/1656; A47B 97/00
USPC .......... 312/257.1, 223.1, 223.2, 265.5, 265.6; 361/679.02, 679.6
See application file for complete search history.

(56) References Cited

U.S. PATENT DOCUMENTS

| 6,899,407 | B1 * | 5/2005 | Lai ............................. 312/223.2 |
| 7,377,602 | B2 * | 5/2008 | Chen et al. ................. 312/223.2 |
| 7,539,010 | B2 * | 5/2009 | Chen et al. ............... 361/679.55 |
| 8,382,214 | B2 * | 2/2013 | Tang .......................... 312/223.2 |
| 2005/0207111 | A1 * | 9/2005 | Cheng et al. .................. 361/686 |
| 2005/0264142 | A1 * | 12/2005 | Cunningham et al. ...... 312/223.2 |
| 2007/0151313 | A1 * | 7/2007 | Fan et al. ........................ 70/101 |
| 2011/0249393 | A1 * | 10/2011 | Mi et al. ................... 361/679.39 |

FOREIGN PATENT DOCUMENTS

| TW | M247887 | 10/2004 |
| TW | M277970 | 10/2005 |
| TW | M400182 | 3/2011 |

\* cited by examiner

*Primary Examiner* — James O Hansen
(74) *Attorney, Agent, or Firm* — Novak Druce Connolly Bove + Quigg LLP

(57) ABSTRACT

A bezel assembly includes a panel, a shielding member with a mounting portion, and a securing assembly. The panel includes a main body with a limiting panel and a blocking portion. A first opening and a through hole are defined in the main body. The securing assembly includes a sliding member and a coil spring secured to the sliding member and the blocking portion. The sliding member is slidably located between the sliding member and the blocking portion, and an axis of the coil spring is substantially perpendicular to the limiting panel. The sliding member is slidable relative to the main body between a first position and a second position, in the first position, the mounting portion extends through the through hole, and the sliding member is engaged in the mounting portion; in the second position, the coil spring is deformed to disengage the sliding member from the mounting portion.

11 Claims, 7 Drawing Sheets

BEZEL ASSEMBLY FOR ELECTRONIC DEVICE

BACKGROUND

1. Technical Field

The present disclosure relates to electronic device enclosures, more particularly to a bezel assembly of an electronic device enclosure.

2. Description of Related Art

Many computer case panels define an opening for an optical disk drive to move in or out of the computer case. A decorating plate and a shielding plate are used to shield the opening. The decorating plate is secured to an interior of the shielding plate with a plurality of clipping members. When the shielding plate is needed to maintain or disassemble, the clipping members are disengaged from the decorating plate after the decorating plate is disengaged from the computer case. The above described disassembly may be laborious and time-consuming. Therefore, there is room in the art for improvement.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
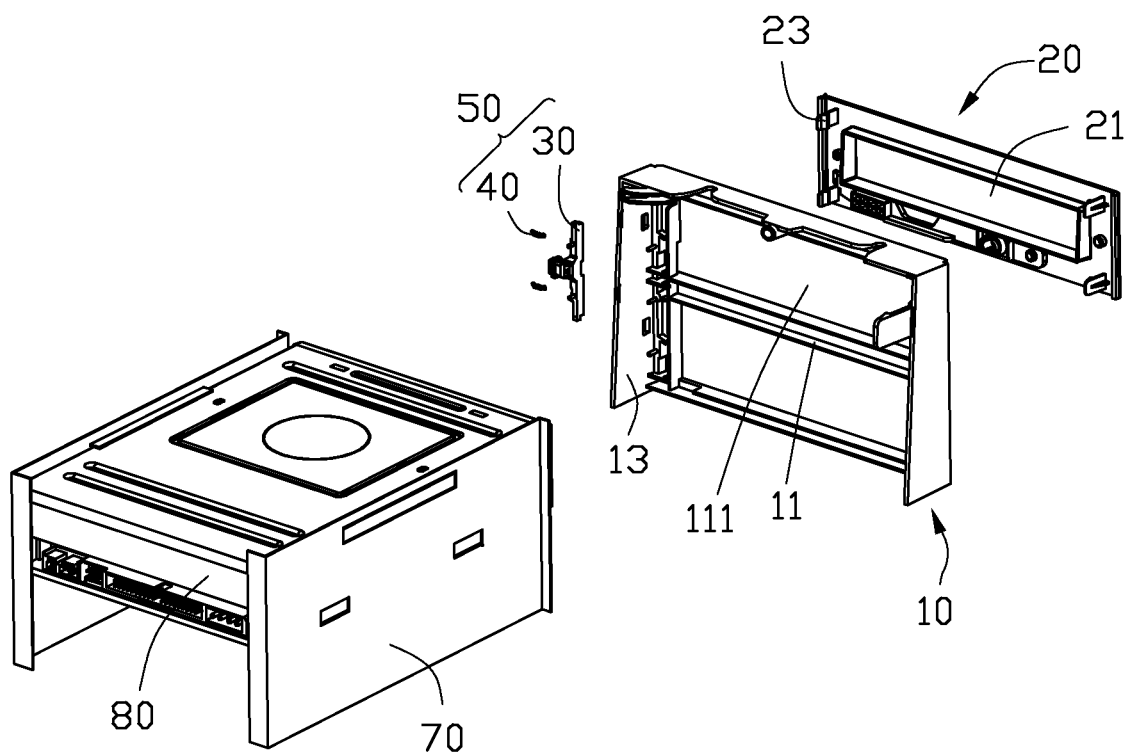
FIG. 1 is an exploded, isometric view of a bezel assembly, a tray and an optical disk drive in accordance with an embodiment.
Figure 2:
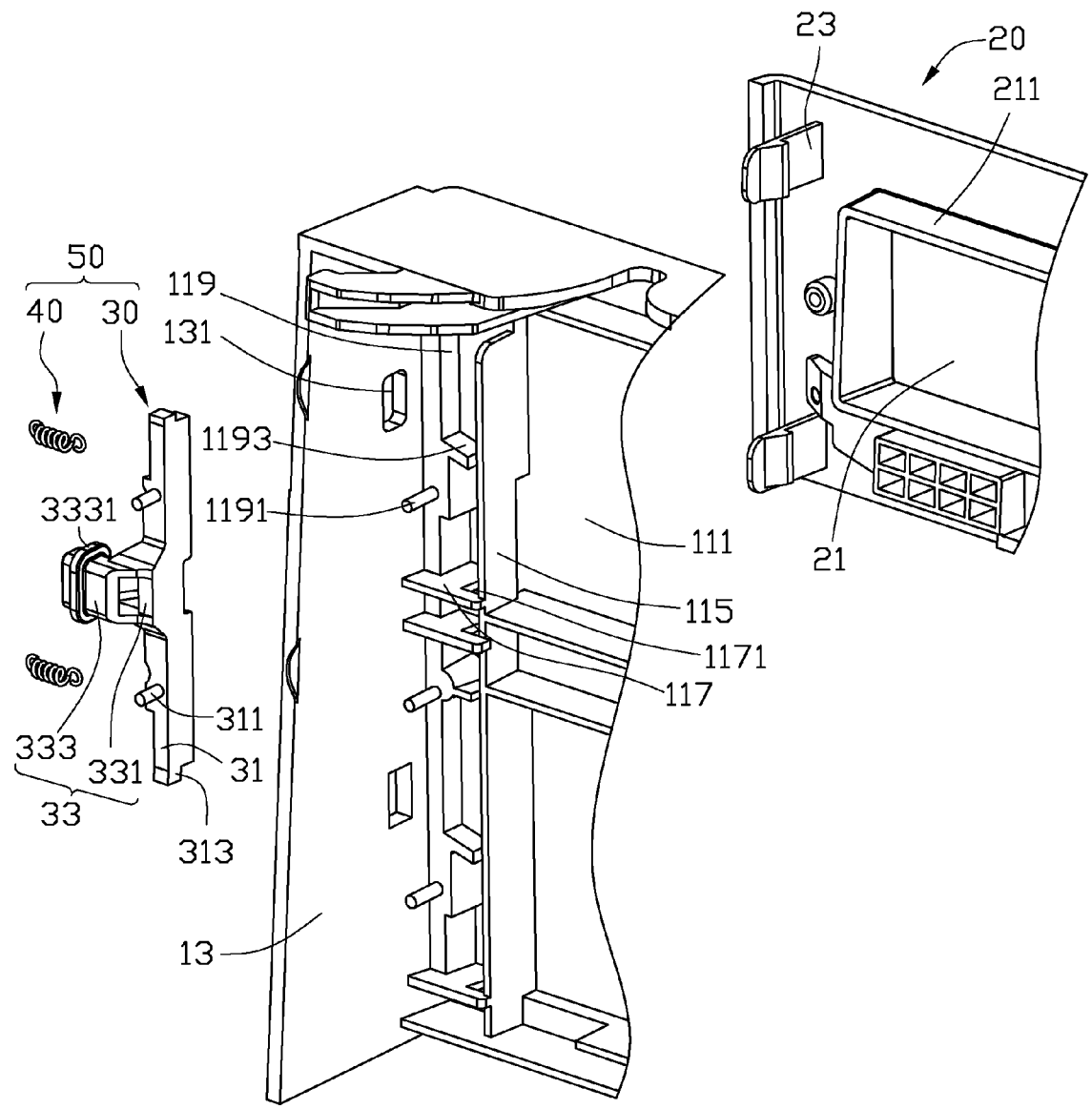
FIG. 2 is an exploded, isometric view of the bezel assembly of FIG. 1.
Figure 3:
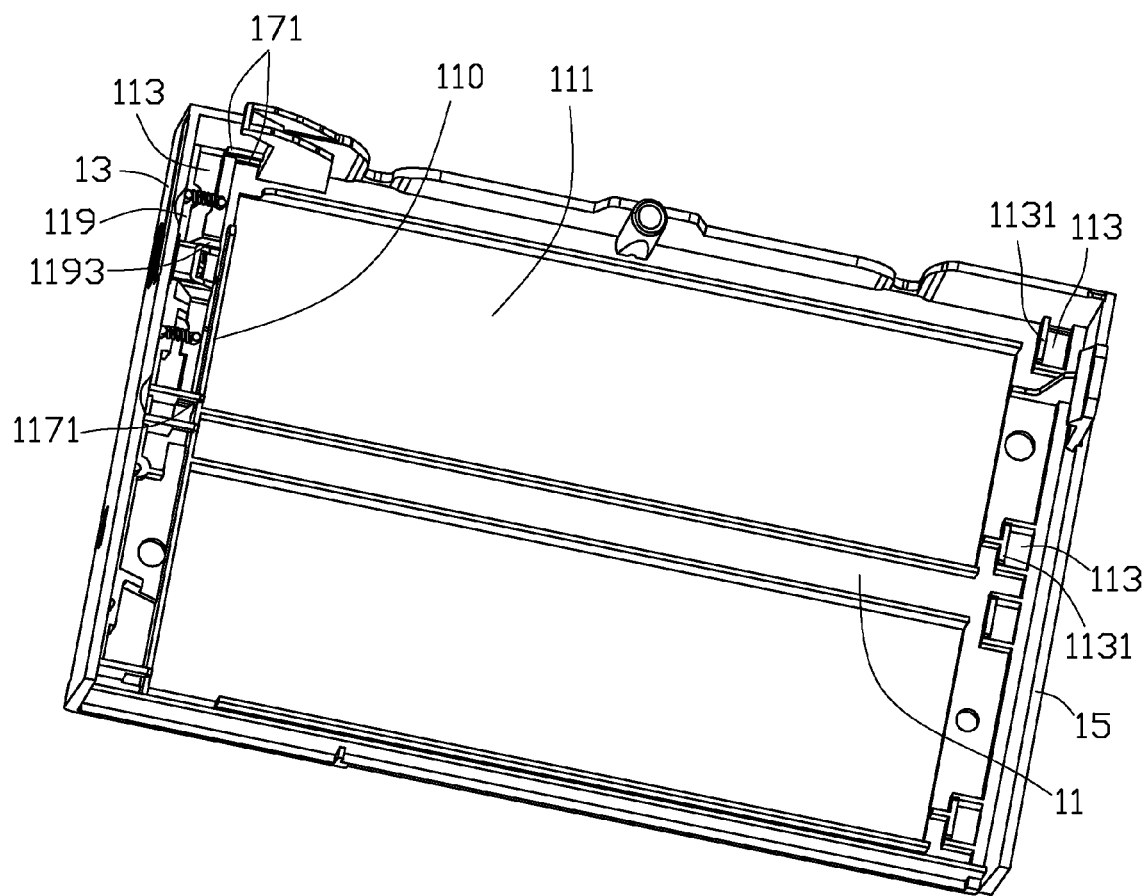
FIG. 3 is an assembled view of a panel and a securing assembly of FIG. 2.
Figure 4:
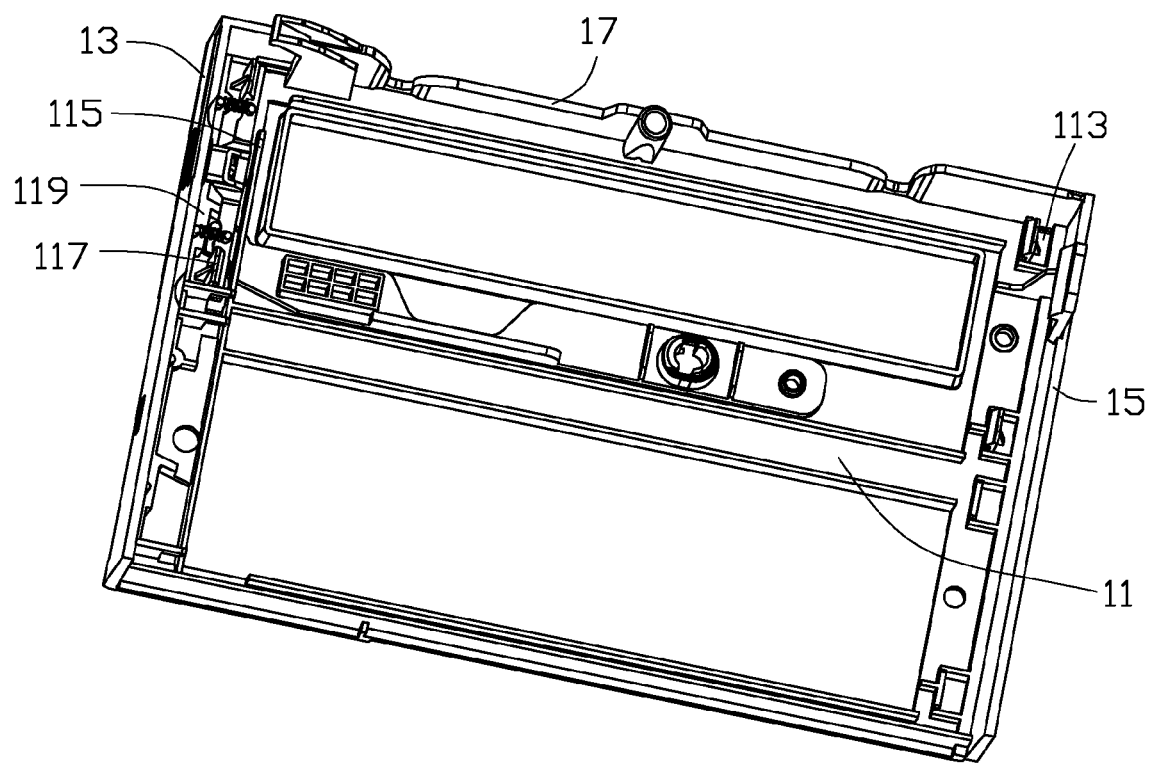
FIG. 4 is an assembled view of FIG. 2.

FIGS. 1-3 show an electronic device in accordance with an embodiment. The electronic device includes a bezel assembly with a panel 10 and a shielding member 20, a securing assembly 50 attached to the panel 10, a tray 70, and an optical disk drive 80. In one embodiment, the panel 10 is a decorating panel of a computer case.

The panel 10 includes a main body 11 and a flange 13 extending from an edge of the main body 11. In one embodiment, the flange 13 is substantially perpendicular to the main body 11. The main body 11 defines a first opening 111 and a plurality of through holes 113 around the first opening 111. The first opening 111 is used for receiving the optical disk drive 80. In one embodiment, a retaining tab 1131 extends from each of the through holes 113. The flange 13 defines a retaining hole 131. A limiting panel 115 extends from an edge of the first opening 111, and a connecting panel 117 is connected to the limiting panel 115 and the flange 13. In one embodiment, the limiting panel 115 is substantially parallel to the flange 13 and perpendicular to the connecting panel 117. The connecting panel 117 defines a first sliding slot 1171.

Figure 5:
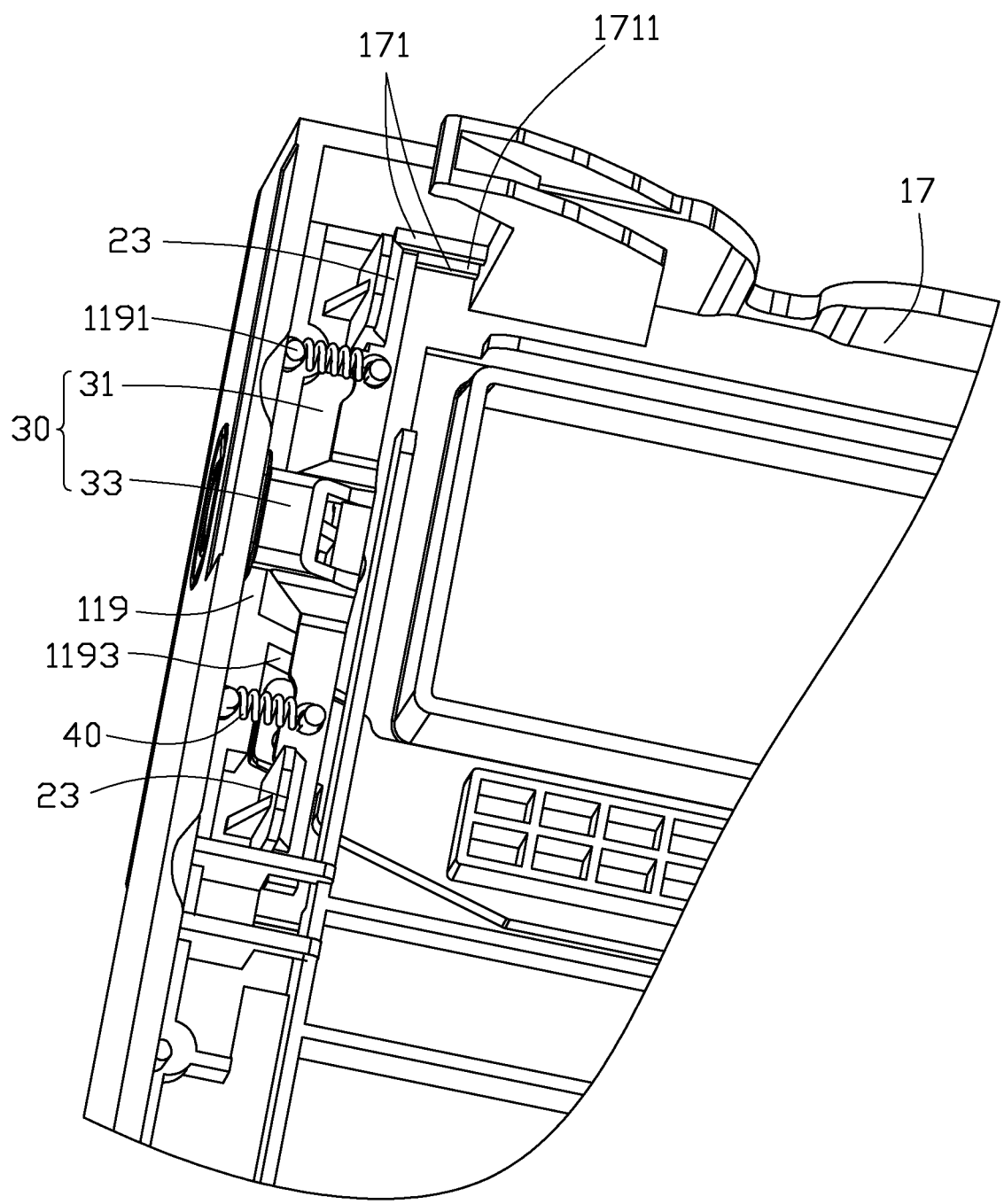
FIG. 5 is an enlarged, cutaway view of FIG. 4.
Figure 6:
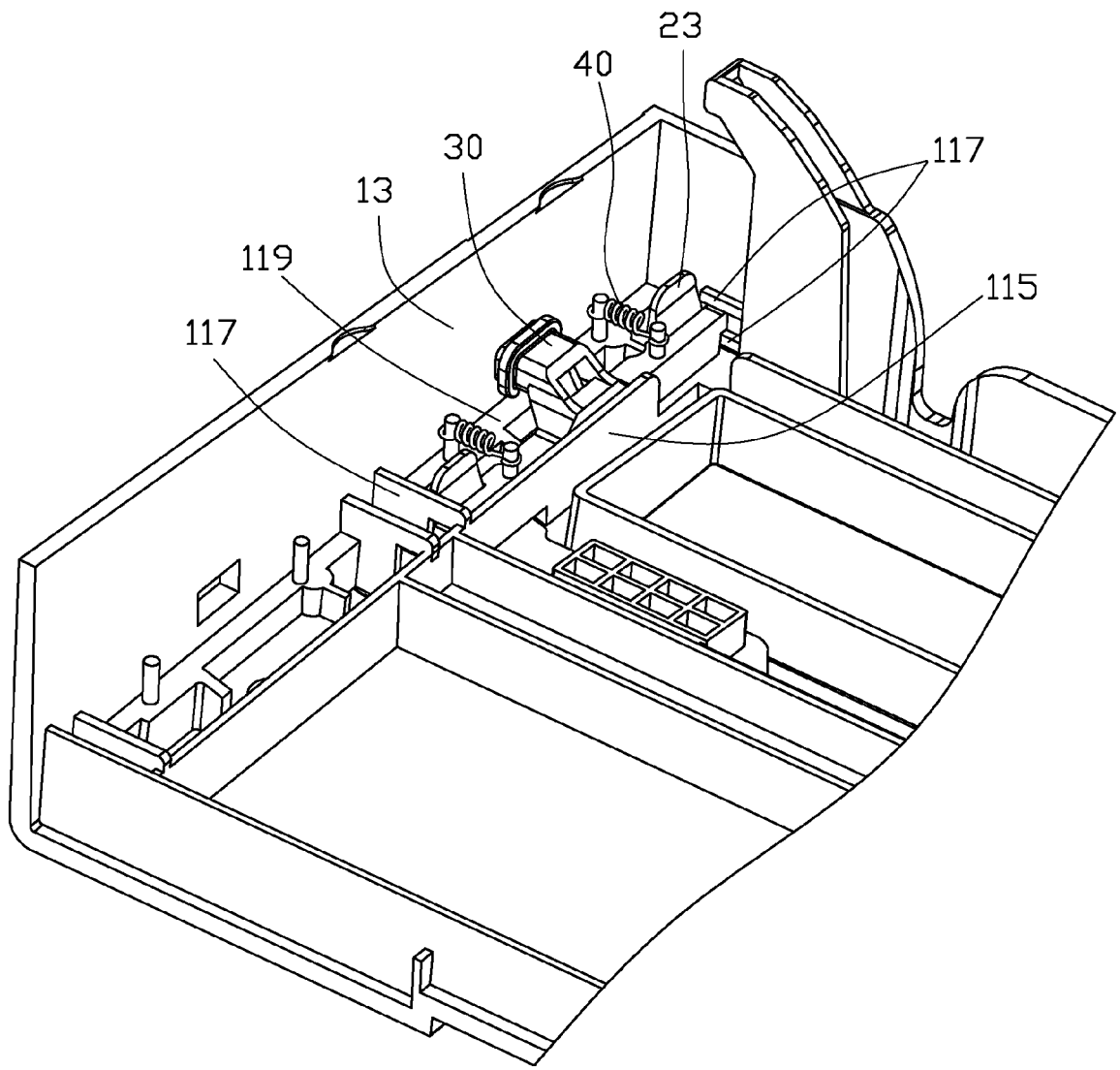
FIG. 6 is similar to FIG. 4, but viewed from a different aspect.
Figure 7:
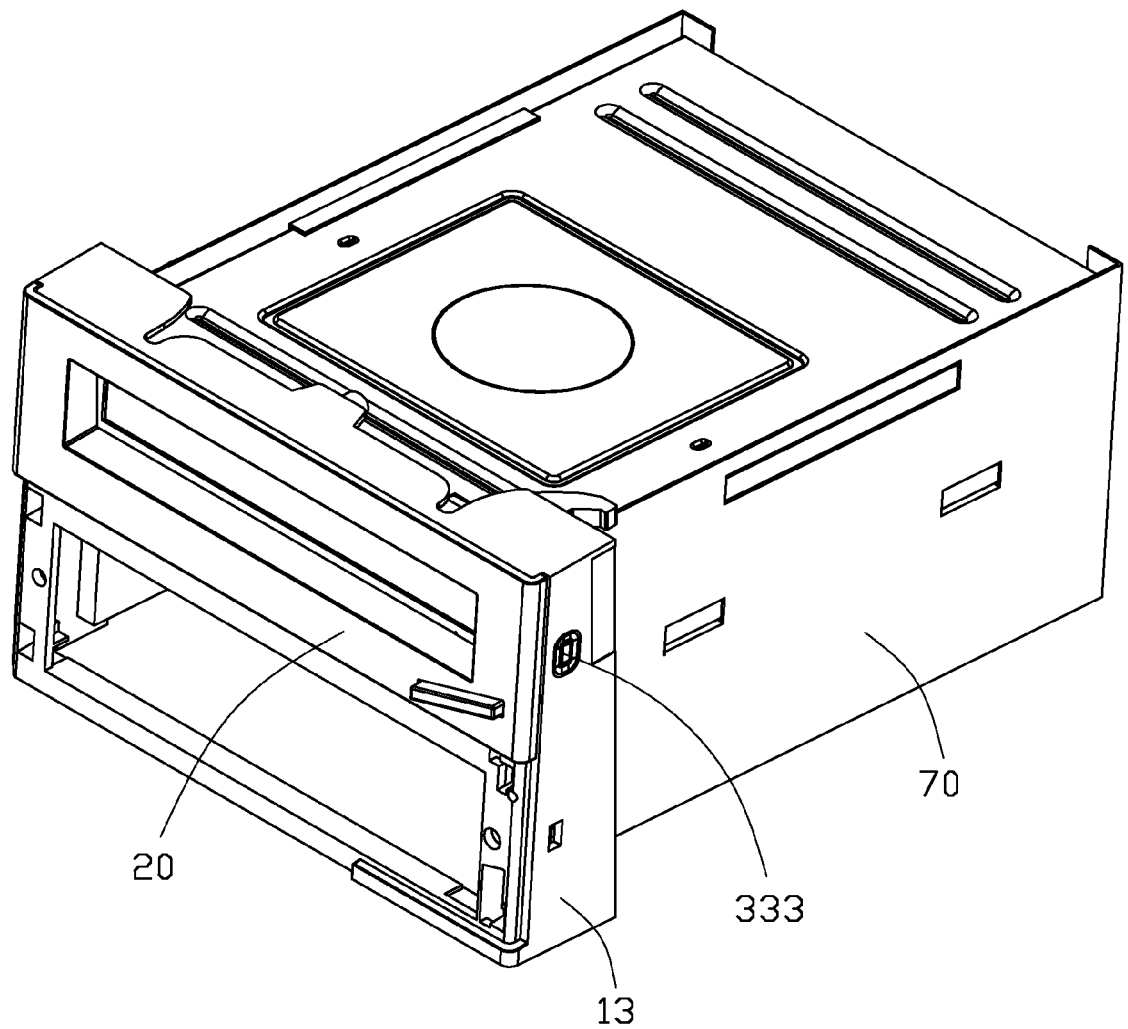
FIG. 7 is an assembled view of FIG. 1.

A blocking portion 119 extends from the flange 13 and is located between the flange 13 and the limiting panel 115. The blocking portion 119 includes a positioning post 1191 and an engaging post 1193. In one embodiment, a sliding way 110 (see FIG. 3) is defined between the blocking portion 119 and the limiting panel 115. The engaging post 1193, is located in the sliding way 110, extends from a first side of the blocking portion 119. The positioning post 1191 extends substantially from a second side of the blocking portion 119. Two parallel retaining tabs 171, together with a second sliding slot 1711 (see FIG. 5), extend from a top portion of the main body 11.

The shielding member 20 defines a second opening 21, and a plurality of mounting portions 23 around the second opening 21. A rectangle frame 211 extends from the second opening 21 and is configured to abut the first opening 111. In one embodiment, each of the mounting portions 23 is a hook, positioned substantially perpendicular to the shielding member 20.

FIG. 2, illustrates the securing assembly 50 of one embodiment. The securing assembly 50 includes a sliding member 30 and two resilient members 40. The sliding member 30 includes a sliding panel 31 and a button assembly 33 connected to the sliding panel 31. Two mounting posts 311 are located on the sliding panel 31, and two inserting portions 313 extend from opposite ends of the sliding panel 31. The button assembly 33 includes a button 333 and a connecting portion 331, connected to the button 333 and the sliding panel 31. A stopping portion 3331 is located on button 333.

FIGS. 4-7, illustrate that in assembly of the sliding panel 31 of one embodiment. The sliding panel 31 is received in the sliding way 110, and the two inserting portions 313 are inserted into the first and second sliding slots 1171, 1711, respectively. The button 333 extends through the retaining hole 131 and then is positioned on an outer surface of the flange 13. A first end of each of the two resilient members 40 is engaged with the mounting post 311, and a second opposite end of each of the two resilient members 40 is engaged with the positioning post 1191. Thus, the two resilient members 40 are engaged with the mounting post 311 and the positioning post 1191. At this point, the stopping portion 3331 abuts the inner surface of the flange 13. In one embodiment, each of the two resilient members 40 is a coil spring, and an axis of each of the two resilient members 40 is substantially perpendicular to the limiting panel 115.

The sliding panel 31 can be positioned in a first position and a second position relative to the flange 13. In the first position, the sliding panel 31 abuts the two engaging posts 1193, the two inserting portions 313 are respectively located on a first end of the first and second sliding slots 1171, 1711, and the first end of the first and second sliding slots 1171, 1711 is away from the limiting panel 115. In the second position, the sliding panel 31 is disengaged from the two engaging post 1193, the two inserting portions 313 are respectively located on a second opposite end of the first and second sliding slots 1171, 1711, and the two resilient members 40 are elastically deformed.

The shielding member 20 abuts the main body 11. The button 333 is operated to move the sliding panel 31 in a first direction that is substantially perpendicular to the flange 13. The two resilient members 40 are deformed, and the sliding panel 31 is positioned in the second position from the first position. The mounting portions 23 extend through the two through holes 113. The two resilient members 40 are deformed, and the sliding panel 31 is moved in a second direction opposite to the first direction. The mounting portions 23 are engaged with the sliding panel 31, and the sliding panel 31 is located in the first position. Thereby, the shielding member 31 is secured to the panel 10.

In disassembly, the button 333 is operated to move the sliding panel 31 into the second position. The sliding panel 31 is disengaged from the two mounting portions 23. The shielding member 20 is moved away form the panel 10 in a direction substantially perpendicular to the shielding member 20. The mounting portions 23 are disengaged from the through holes 113, and the shielding member 20 can then be detached from the panel 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A bezel assembly comprising:
    a panel comprising a main body; the main body comprising a limiting panel and a blocking portion;
    and a first opening and a through hole defined in the main body;
    a connecting panel connected to the blocking portion and the limiting panel, a first sliding slot being defined in the connecting panel;
    a shielding member, attached to the panel and comprising a mounting portion; a second opening, defined in the shielding member; and a rectangle frame, extending from the second opening and configured to abut the first opening, and
    a securing assembly comprising a sliding member and a coil spring secured to the sliding member and the blocking portion; and the sliding member is slidably located between the limiting panel and the blocking portion; one end of the sliding member being engaged in the first sliding slot;
    wherein the sliding member is slidable relative to the main body between a first position and a second position; when the sliding member is in the first position, the mounting portion extends through the through hole, and the sliding member is engaged in the mounting portion; when the sliding member is in the second position, the coil spring is actuated to disengage the sliding member from the mounting portion.

2. The bezel assembly of claim 1, wherein a positioning post is located on the blocking portion; a mounting post is located on the sliding member; and a first end of the coil spring is engaged with the positioning post, and a second opposite end of the coil spring is engaged with the mounting post.

3. The bezel assembly of claim 1, wherein the panel further comprises a flange that is substantially perpendicular to the main body, and the blocking portion extends from the flange towards the limiting panel.

4. The bezel assembly of claim 3, wherein the sliding member comprises a sliding panel and two inserting portions extending from opposite ends of the sliding panel, the main body defines a second sliding slot, and the two inserting portions are engaged in the first sliding slot and the second sliding slot respectively.

5. The bezel assembly of claim 4, wherein two parallel retaining tabs are located on the main body, and the second sliding slot is defined between the two parallel retaining tabs.

6. The bezel assembly of claim 4, wherein the sliding member further comprises a button and a connecting portion connected to the button and the sliding panel, the flange defines a retaining hole for receiving the button, the button is located on an outer surface of the flange, and the connecting portion is located on an inner surface of the flange.

7. The bezel assembly of claim 6, wherein a stopping portion is located between the button and the connecting portion, and the stopping portion abuts the inner surface of the flange for preventing the connecting portion from extending through the retaining hole.

8. The bezel assembly of claim 1, wherein the sliding member is moveable in a first direction that is substantially parallel to the main body, and the mounting portion is moveable in a second direction substantially perpendicular to the first direction.

9. The bezel assembly of claim 1, wherein an engaging post extends from the blocking portion and is located between the limiting panel and the blocking portion;
    when the sliding member is in the first position, the sliding member abuts the engaging post; when the sliding member is in the second position, the coil spring is actuated to disengage the sliding member from the engaging post.

10. A bezel assembly comprising:
    a panel comprising a main body and a flange substantially perpendicular to the main body; the main body comprising a blocking portion extending from the flange and a limiting panel substantially parallel to the flange; a first opening and a through hole defined in the main body, and the first opening configured to receive an electronic component; a sliding way defined between the blocking portion and the limiting panel;
    a shielding member, attached to the panel and comprising a mounting portion;
    a securing assembly comprising a sliding member and a coil spring secured to the sliding member and the blocking portion; and the sliding member is slidably received in the sliding way;
    wherein the mounting portion extends through the through hole and engaged with the sliding member, the sliding member is slidable relative to the limiting panel, and the coil spring is deformed to disengage the sliding member from the mounting portion;
    the sliding member comprises a sliding panel and two inserting portions extending from opposite ends of the sliding panel, the main body defines a first sliding slot and a second sliding slot, and the two inserting portions are engaged in the first sliding slot and the second sliding slot respectively; and
    the sliding member further comprises a button and a connecting portion connected to the button and the sliding panel, the flange defines retaining hole for receiving the button, the button is located on an outer surface of the flange, and the connecting portion is located on an inner surface of the flange.

11. The bezel assembly of claim 10, wherein a stopping portion is located between the button and the connecting portion, and the stopping portion abuts the inner surface of the flange for preventing the connecting portion from extending through the retaining hole.

* * * * *